J. J. HENNESSEY.
SIDE BEARING FOR RAILWAY CARS.
APPLICATION FILED NOV. 5, 1915.
1,171,433.
Patented Feb. 15, 1916.
2 SHEETS—SHEET 1.
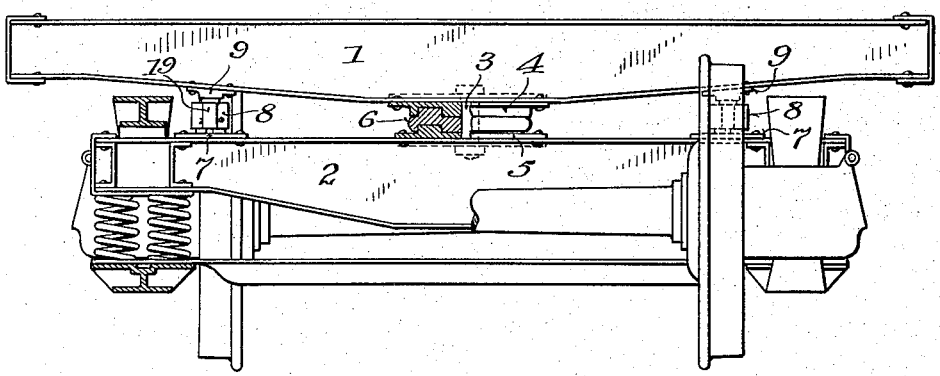
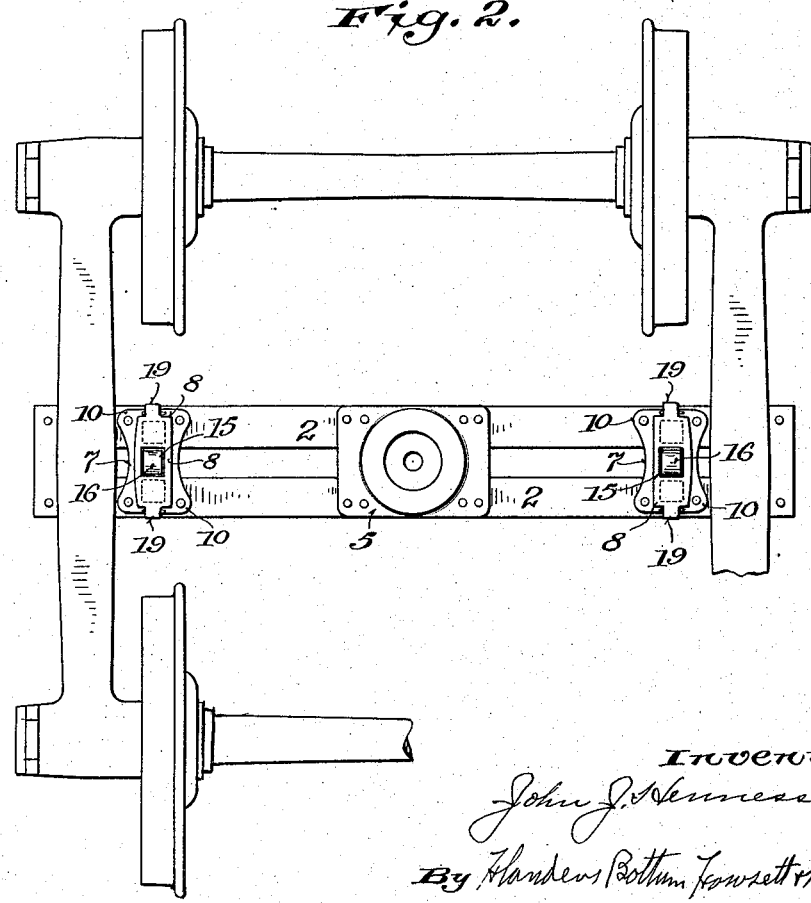

J. J. HENNESSEY.
SIDE BEARING FOR RAILWAY CARS.
APPLICATION FILED NOV. 5, 1915.
1,171,433.
Patented Feb. 15, 1916.
2 SHEETS—SHEET 2.
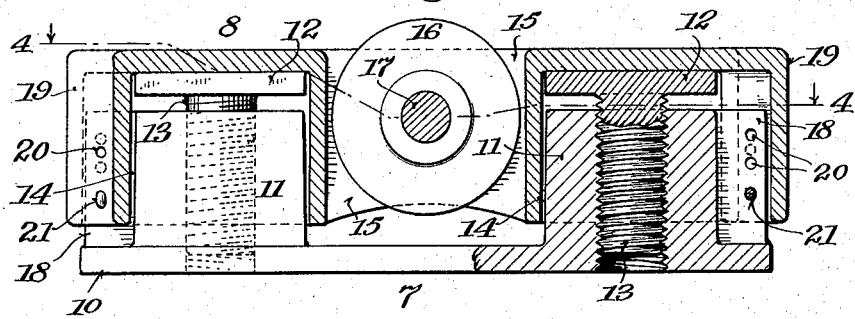
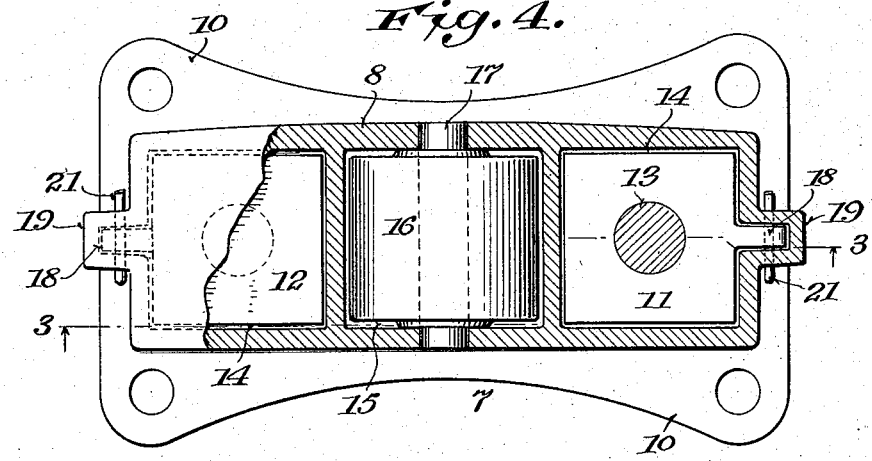
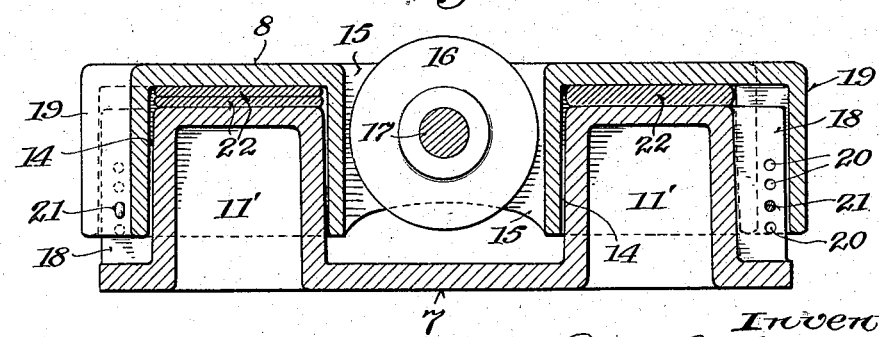
Inventor
John J. Hennessey,
By Flanders Bottum Fawsett & Bottum
Attorneys.

UNITED STATES PATENT OFFICE.

JOHN J. HENNESSEY, OF MILWAUKEE, WISCONSIN.

SIDE BEARING FOR RAILWAY-CARS.

1,171,433.   Specification of Letters Patent.   Patented Feb. 15, 1916.

Application filed November 5, 1915. Serial No. 59,725.

*To all whom it may concern:*

Be it known that I, JOHN J. HENNESSEY, a citizen of the United States, residing at Milwaukee, in the county of Milwaukee and State of Wisconsin, have invented certain new and useful Improvements in Side Bearings for Railway-Cars, of which the following is a specification, reference being had to the accompanying drawing, forming a part thereof.

This invention relates more particularly to bearings interposed between the truck and body bolsters of cars at a distance from the center pins of the trucks, to prevent tipping of the bodies on the trucks and undue strain on the center bearings or pivot connections between the trucks and bodies.

The main objects of the invention are to facilitate vertical adjustment of the side bearings to correspond with like adjustment of the center bearings in order to maintain the bodies at the prescribed distance above the track on which the cars run, and hereinafter particularly described and operation of devices of this class.

The invention consists in certain novel features in the construction, arrangement and combination of parts of the device as hereinafter particularly described and pointed out in the claims.

In the accompanying drawing like characters designate the same parts in the several figures.

Figure 1 is a general view partly in elevation and partly in vertical cross section, of a car truck and body bolster to which side bearings embodying the invention are applied; Fig. 2 is a plan view of the truck and side bearings without the body bolster, a portion of the truck being broken away; Fig. 3 is an enlarged vertical longitudinal section on the line 3—3, Fig. 4, of one of the side bearings shown in Figs. 1 and 2; Fig. 4 is a plan view and horizontal section on the line 4—4, Fig. 3; and Fig. 5 is a vertical longitudinal section of modification of the bearing.

Referring to Figs. 1 and 2, 1 designates a body bolster and 2 a truck bolster which are pivotally connected with each other in the usual or any suitable manner by a center bearing and center pin or king bolt 3.

The center bearing preferably has special provision to facilitate the vertical adjustment of the body bolster 1 relative to the truck bolster 2, as shown for example, in United States Letters Patent No. 1,009,306, dated November 21, 1911. This center bearing comprises three plates, 4, 5 and 6, formed with interfitting circular bosses and grooves or channels concentric with the pin or bolt 3. The plates 4 and 5 are bolted or riveted to the bolsters 1 and 2 respectively, and the intermediate or filling plate 6, having faces which are counterparts of the opposing and contacting faces of the plates 4 and 5, may be made of different thicknesses, or a plurality of such plates may be used to effect the desired adjustment.

The side bearing constituting the present invention comprises a base member 7, which may be applied either to the upper side of the truck bolster 2, as shown, or to the under side of the body bolster 1, a bearing member 8 adjustably supported upon the base member, and a bearing plate or block 9 fastened to the other bolster in position to coöperate with the bearing member 8.

As shown more in detail in Figs. 3 and 4, the base member 7 is formed with an outwardly projecting flange 10 for bolting or riveting it to a bolster, preferably the truck bolster 2, and adjacent to its ends with two square or polygonal pillars 11. Square or polygonal plates or rests 12, corresponding in shape with the pillars 4, are formed or provided with depending vertical stems 13, which are threaded and vertically adjustable in the pillars 11. The pillars 11 and rests 12 form vertically adjustable supports for the bearing member 8. The bearing member 8 is formed with two downwardly opening polygonal sockets 14, which loosely and removably fit over the pillars 11 and rests 12.

In a square or rectangular recess 15, formed in the bearing member 8 between the sockets 14, an anti-friction roller 16 is mounted on a cross pin or axle 17. On the side opposite the base member 7, the roller 16 projects above or beyond the member 8, so as to engage and coöperate with the plate or block 9. The recess 15 is open at both its upper and lower ends, and the sides of the member 8 next to the member 7 are cut away, as shown in Fig. 3, to prevent cinders and dirt from lodging, and ice from forming, in said recess and interfering with the free operation of the roller 16.

To prevent separation of the members 7 and 8 of the bearing, especially before they are applied to cars, the pillars 11 on the base member 7 are formed with vertical ribs 18, and the bearing member 8 is formed at the ends with vertical channel extensions 19 fitting loosely over said ribs, these ribs and extensions being formed with transverse holes 20 through which pins or cotters 21 are inserted.

Vertical adjustment of these side bearings to correspond with the adjustment of the associated center bearing, is effected by removing the bearing members 8 from the base members 7, turning the plates or rests 12 with their screwthreaded stems 13 more or less, to extend or shorten the supports for the bearing member as required, and then replacing the bearing member in position thereon. The polygonal shape of the rests or plates 12 corresponding with that of the sockets 14 in which they are inserted, the bearing member 8 when placed in position thereon, prevents them from turning and holds them in their adjusted positions.

The screwthreaded holes in the pillars 11 are open at their lower ends so that they are self-clearing, and cinders and dirt will not be retained therein and affect the adjustment of the rests 12.

The vertical adjustment of the supports on the base member 7 for the removable bearing member 8, may be accomplished in different ways. For example, as shown in Fig. 5, the pillars 11' may be extended or lengthened in order to raise the bearing member 8 with the roller 16 more or less, by placing between them and the tops or closed ends of the sockets 14, plates or shims 22 of the required thickness, or any number of such plates or shims as may be required to produce the desired result. In this form of the bearing the pillars 11' may for the sake of lightness and to save metal, be made hollow.

Various other changes in the details of construction and arrangement of parts may be made without affecting the mode of operation or the principle of the bearings and within the scope of the invention as defined in the following claims.

I claim:

1. In a side bearing for railway cars the combination of a base member adapted for attachment to a bolster and provided with vertically adjustable supports, and a bearing member having sockets fitting over said supports.

2. In a side bearing for railway cars the combination of a base member provided with means for attachment to a bolster and with vertically adjustable supports, and a bearing member provided with a roller and formed on opposite sides of the roller with sockets fitting over said supports.

3. In a side bearing for railway cars the combination of a base member formed with a flange for attachment to a bolster and with spaced vertically adjustable supports, a bearing member formed with a central open recess and on opposite sides of the recess with sockets fitting over said supports and closed on the side opposite the base member, and a horizontal roller mounted in said recess transversely to the bearing member and projecting therefrom on the side opposite the base member.

4. In a side bearing for railway cars the combination of a base member provided with a vertically adjustable rest threaded in said member, and a bearing member having a socket removably fitting over said rest.

5. In a side bearing for railway cars the combination of a base member provided with a polygonal rest having a vertical stem threaded in said member, and a bearing member having a polygonal socket removably fitting over said rest.

6. In a side bearing for railway cars the combination of a base member formed with a flange for attachment to a bolster and with spaced polygonal pillars, correspondingly shaped rests having stems threaded vertically in said pillars, a bearing member formed with sockets removably fitting over said pillars and rests which form vertically adjustable supports for the bearing member, and a roller mounted in said bearing member between said supports and projecting beyond said supports on the side opposite the base member.

7. In a side bearing for railway cars the combination of a base member provided with supporting pillars having vertical ribs formed with transverse holes, a bearing member having sockets removably fitting over said pillars and having vertical channel extensions fitting said ribs and formed with holes adapted to register with the holes therein, and pins fitting in said holes for preventing the separation of the members.

In witness whereof, I hereto affix my signature in presence of two witnesses.

JOHN J. HENNESSEY.

Witnesses:
 CHAS. L. GOSS,
 ALICE E. GOSS.

Copies of this patent may be obtained for five cents each, by addressing the "Commissioner of Patents, Washington, D. C."